(12) United States Patent
Berg et al.

(10) Patent No.: US 6,745,208 B2
(45) Date of Patent: Jun. 1, 2004

(54) METHOD AND APPARATUS FOR SYNCHRONIZING AN XML DOCUMENT WITH ITS OBJECT MODEL

(75) Inventors: Daniel Berg, Apex, NC (US); George Paul DeCandio, Apex, NC (US); L. Scott Rich, Apex, NC (US); Ritchard L. Schacher, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 548 days.

(21) Appl. No.: 09/870,601

(22) Filed: May 31, 2001

(65) Prior Publication Data

US 2002/0184264 A1 Dec. 5, 2002

(51) Int. Cl.$^7$ ............................................. G06F 17/30
(52) U.S. Cl. .................................. 707/201; 707/103 R
(58) Field of Search ............................... 707/1, 10, 201, 707/103 R, 206; 345/853, 760, 764; 704/270; 715/511, 513; 717/108, 126

(56) References Cited

U.S. PATENT DOCUMENTS 6,404,445 B1 * 6/2002 Galea et al. ................. 345/853
6,578,000 B1 * 6/2003 Dodrill et al. ............... 704/270
6,635,089 B1 * 10/2003 Burkett et al. ............... 715/513

* cited by examiner

*Primary Examiner*—Diane D. Mizrahi
*Assistant Examiner*—Apu M Mofiz
(74) *Attorney, Agent, or Firm*—Synnestvedt & Lechner LLP; Gregory M. Doudnikoff, Esq.

(57) ABSTRACT

A method and apparatus for synchronizing an XML document object model with the corresponding object model on the fly and in real time such that changes in either the document object model or the object model can be immediately reflected in the other without re-parsing the XML document. The invention utilizes a series of DOM/object model adapter software modules, each responsible for one (or more) object model properties and document object model nodes, respectively. Each adapter is registered to receive notification of a change in an object model property or DOM node for which it is responsible and updates the corresponding DOM node or object model property, respectively.

31 Claims, 6 Drawing Sheets

METHOD AND APPARATUS FOR SYNCHRONIZING AN XML DOCUMENT WITH ITS OBJECT MODEL

FIELD OF THE INVENTION

The invention pertains to the synchronization of an XML document with its rendering. More particularly, the invention pertains to synchronizing a document object model (DOM) of an XML document with its object model in real time.

BACKGROUND OF THE INVENTION

XML (eXtensible Markup Language) is a platform-independent programming language that is particularly adapted for use on distributed networks such as the Internet because it provides a flexible mechanism for creating common information formats and sharing both the format and the data across different software applications over the network. XML comprises markup symbols (tags) that describe the content of a file. XML is like HTML (HyperText Markup Language) in its use of markup symbols, but has at least two key distinctions over HTML. First, HTML has a specific set of defined markup symbols, whereas XML is extensible in that the markup symbols allowed in XML are unlimited and self defining. That is, while XML also has standardized markup symbols, XML programmers are not limited to the standard set of defined markup symbols, but can define new markup symbols. Secondly, whereas HTML is limited in that the tags and attributes define only how the actual content is to be displayed, XML tags and attributes can define both how the information is to be displayed (by a Web browser, for instance) and what the content is. In this specification, a basic familiarity with XML is assumed in the reader.

Because of its flexibility and readability, XML is often used as a serialization mechanism for an object model. That is, a programmer can define XML markup symbols to correspond to certain types of data and then create XML files (XML files are also called XML documents or XML pages) providing content associated with the tags and attributes. For instance, if a programmer wishes to establish a standard format for describing a type of product so that the description of products of that type can be shared across multiple applications with different platforms, the programmer can define a tag that corresponds to that product, e.g., SHIRT and attributes of that tag, each defining a property of that product, e.g., a SIZE attribute, a COLOR attribute, a MATERIAL attribute, a COST attribute, etc. The actual data content, e.g., large, red and blue stripes, cotton, $29.95, etc. is provided in the field of the attribute. The data about the product can then be transmitted over a network in a platform-independent XML page to any other computer running an XML interpreter program that is programmed to understand those particular markup symbols.

When an application program (e.g., an XML Editor) receives an XML document, several steps are performed to convert that XML document into a displayed (or rendered) page on the user's computer monitor. In one well known scheme, first, the XML document is opened and parsed to build a document object model (DOM) containing the data. Document Object Model is a programming interface specification developed by the World Wide Web Consortium (W3C) that lets a programmer create and edit HTML and XML files as program objects. The W3C has recently issued a DOM level 2 specification which is incorporated herein by reference. A DOM essentially is a tree data structure representation of an XML file, wherein each node of the tree is an XML element, e.g., a tag, an attribute, a value, etc. After the DOM is generated, it is traversed to create an object model. Where the XML page is to be converted into a display, the object model is the model from which the display is directly rendered. Thus, the process of rendering an XML page can be considered to comprise four steps; (1) the XML document step, (2) the document object model step, (3) the object model step, and (4) the actual display step.

Several XML editor programs are presently available on the market that can be used to help generate XML pages without necessarily having in depth knowledge of XML programming. For instance, XMetal is one particular widely available XML editor produced and sold by SoftQuad Software, Ltd. of Toronto, Ontario, Canada. A typical XML editor can present to the user of the program various different views of an XML document. For instance, the editor, of course, can provide a source view of the XML source code in the actual text format. It further can generate a graphical representation of the DOM tree as well as a graphical representation of the object model. Finally, of course, it can generate the actual display view, e.g., the user interface (UI) that would be rendered when opening the page. The editor typically allows the user to interact and edit the XML document in any of those views. When the user is satisfied with an edit or set of edits, the user can then cause the edits to be converted to actual XML text.

In developing XML pages, it would be desirable for a developer using an editor program to be able to switch back and forth between a source view of the XML page (e.g., the DOM view or the XML text view) and a display view of the XML document (e.g., the actual display view or an object model view). For instance, a developer might first write an XML document or load a preexisting XML page containing some basic format and/or content and then edit it using an XML editor program in any one of the DOM view, the object model view, or the actual display view. More particularly, a developer may enter one or more edits in the DOM tree view and then wish to see how those changes affected the actual display view or the object model view. If the developer is either not satisfied with the edits or simply has more edits to enter, the developer might then enter additional edits. The developer may choose to enter these further edits in the display or object model view. Alternately, the developer may wish to return to the DOM tree view to enter the further edits.

Techniques are known for converting changes from the DOM tree view to the actual XML. Further, techniques are known for transferring changes made in an actual display view to the object model. Of course, it is also well known in the art how to convert from XML to the DOM tree and how to convert from the object model to the actual display.

The subject matter of the present invention pertains primarily to the transfer (or reflection) of edits between the display side (particularly the object model) and the source side (particularly the document object model).

In prior art editors, reflecting edits made on the display side to the DOM tree or changes made on the source side to the display side required that the XML document be completely reprocessed; that is, that the entire document be serialized and re-parsed to generate a new DOM from which a new object model is then generated in order to produce the actual display.

Thus, it should be apparent that switching between the source view and the display view requires a complete re-parsing of the XML document and is thus time consuming. In addition, developers frequently put comments in the XML text view or other views of a document and/or prefer to use certain indentation protocols for organizational purposes. However, the indentation and the comments do not form part of the object model. Thus, for example, if a developer makes a change in the object model and then wants that change to be fully synchronized across the XML code, DOM and object model, the XML editor will need to completely serialize and re-parse the XML file to create a new instance of the DOM, object model and actual display. Since the object model does not understand the indentations or the comments, they are not preserved upon re-parsing. This can be very annoying to the developer. Even further, selections and state information which the user may have entered by interacting with a display view, also will be lost.

Accordingly, it is an object of the present invention to provide an improved XML editor.

It is another object of the present invention to provide an improved method and apparatus for synchronizing an object model to a DOM and vice versa.

SUMMARY OF THE INVENTION

The invention is a method and apparatus for synchronizing a document object model (DOM) with the corresponding object model and vice versa. The method and apparatus of the present invention is particularly useful for XML editors because changes made on the source side (and particularly the DOM) or the display side (and particularly the object model) are reflected to the other without serializing and re-parsing the entire XML file, but instead rewriting only the particular DOM node or object model property that is changed.

In accordance with the invention, a map is maintained of the information needed to reflect DOM node information to a corresponding object model property and reflect object model property information to the corresponding DOM node. Such map information typically would include information such as the tags and attributes of each node. The map can be organized as a plurality of collections of data items (herein termed map info objects), each collection pertaining to one adapter.

In accordance with the invention, a plurality of adapter software modules are created upon parsing of an XML document, each adapter responsible for reflecting changes made to a subset of DOM nodes to the corresponding object model properties and vice versa. Each adapter is capable of synchronizing in either direction, i.e., it can reflect changes made in the DOM to the object model and changes made in the object model to the DOM. Each adapter is responsible for a small portion of the document. Therefore, each edit can be reflected between the object model and the DOM quickly without re-parsing or iterating over the entire document.

In accordance with the invention, when a DOM is initially generated from an XML document, a plurality of DOM/object-model adapters are created from the map information. The portion of the document for which each adapter is responsible should be selected such that each adapter is relatively simple. For example, a different adapter is responsible for each node of the DOM tree.

Since a change to a DOM node or an object model property can have ripple effects to other, child nodes or child properties, the map includes information indicating any other adapters responsible for child nodes or properties that also need to be updated (hereinafter child adapters). Thus, part of the process of creating an adapter is registering with the pertinent DOM node(s) or object model property(ies), respectively, those changes that should be reported to that adapter.

Thereafter, whenever an object model property is updated, notification is sent to the corresponding DOM/object model adapter. That adapter iterates through the map list and, for each info object in the list, reflects the change to corresponding DOM node(s). If the change has ripple effects to other object model properties for which a different adapter is responsible (a child adapter), one of the info objects in the list for the parent adapter will so indicate and that child adapter will be called and it will iterate through its map list reflecting the changes to the DOM. Depending on the particular change, the child adapter may first need to be created or it may already have been created and merely need updating.

In the opposite direction, when a DOM node is updated, essentially the same process is performed in reverse. Particularly, the DOM-to-object model adapter is notified of the change and that adapter retrieves the map info object(s) for the corresponding node. For each map info object for that adapter, the corresponding object model property is updated (or created, if necessary) including the updating or creation of new child adapters, if necessary.

Thus, in accordance with the invention, the source view can be synchronized to the display view and vice versa on the fly in real time without the need to serialize and re-parse the entire document. In an XML editing environment, this allows a developer to keep both the display view and the source view open simultaneously and synchronized to each other.

DETAILED DESCRIPTION OF THE INVENTION

The present invention is particularly suitable for use in XML editor software applications wherein small or large changes can be made in one of the XML DOM tree or the object model that should be reflected to the other. However, the invention is not limited to such an embodiment. As will be discussed below, there are practical applications of the invention outside of editors. Further, the invention is not limited to use in connection with XML code, but is applicable to any serialization mechanism that has an in-memory representation that can issue notifications of changes.

The invention provides a method and apparatus for reflecting edits made in a DOM to an object model in real time without serializing and re-parsing the XML. Likewise, edits made to the display view or object model are reflected to the DOM in real time without the need to serialize and/or re-parse the XML. Accordingly, a software developer can observe changes made in a source view of a file in the display view and vice versa immediately and without the loss of information such as indentations and comments.

The present invention enables such reflection by the use of a plurality of DOM/object model adapter software modules, each responsible for a subset of nodes in the DOM tree and the corresponding properties of the object model. In at least one embodiment, each DOM node has a separate adapter. Each adapter module, upon creation, registers itself to be notified of any changes to the DOM node(s) and object model property(ies) for which it is responsible.

In accordance with the invention, when a change is made in the DOM or the object model, it is immediately reflected to the other without serializing or parsing the XML file. In this manner, the source views (e.g., the XML text view and the DOM tree view) and the display views (e.g., the actual display view and the object model view) are maintained in synchronization. DOM level 2 fully supports notification of changes made to a DOM node. Any software module desiring notification merely needs to register with the DOM or object model for the DOM tree node(s) in which it is interested. Moreover, the object model used must provide a mechanism for notification of property changes. In this embodiment, the object model used is a MOF, which provides notification.

Figure 1A:
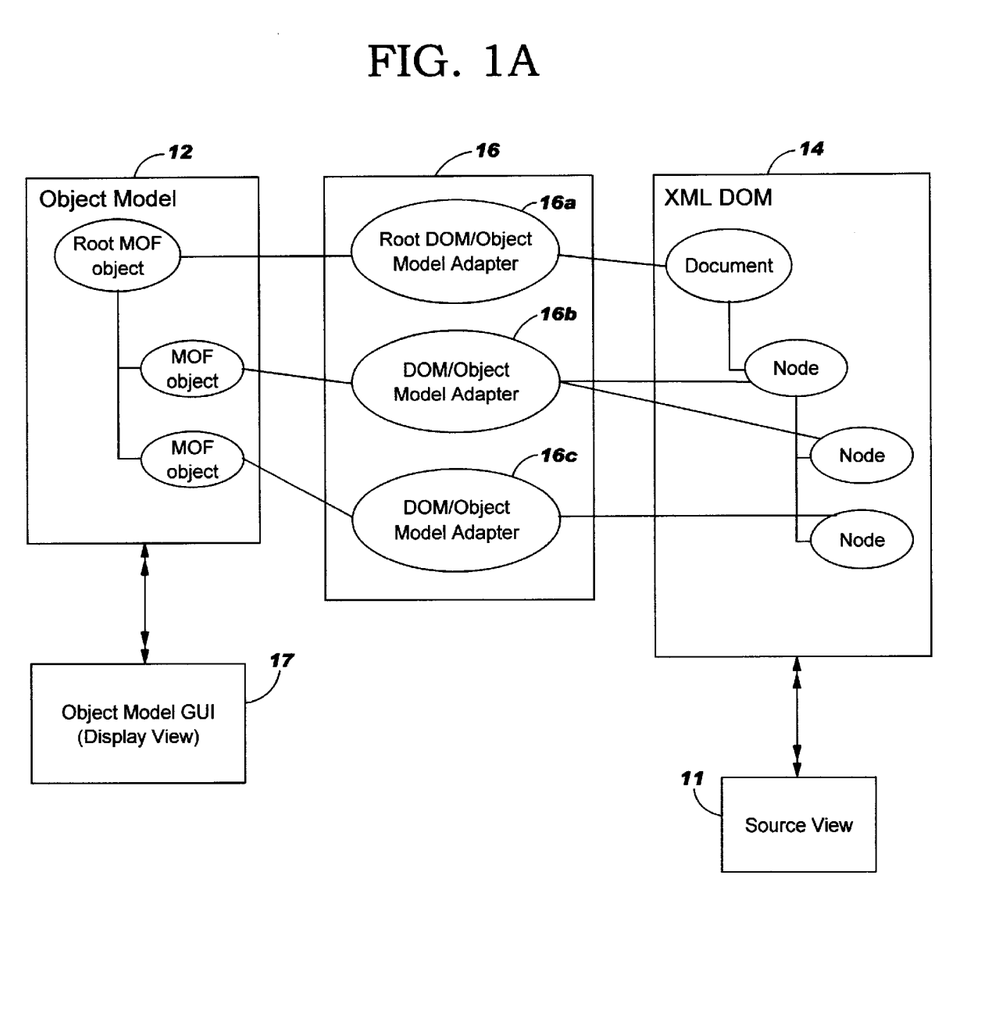
FIG. 1A is a block diagram illustrating the relationship between the object model, the DOM and the DOM/object model adapters in accordance with the present invention.
Figure 1B:
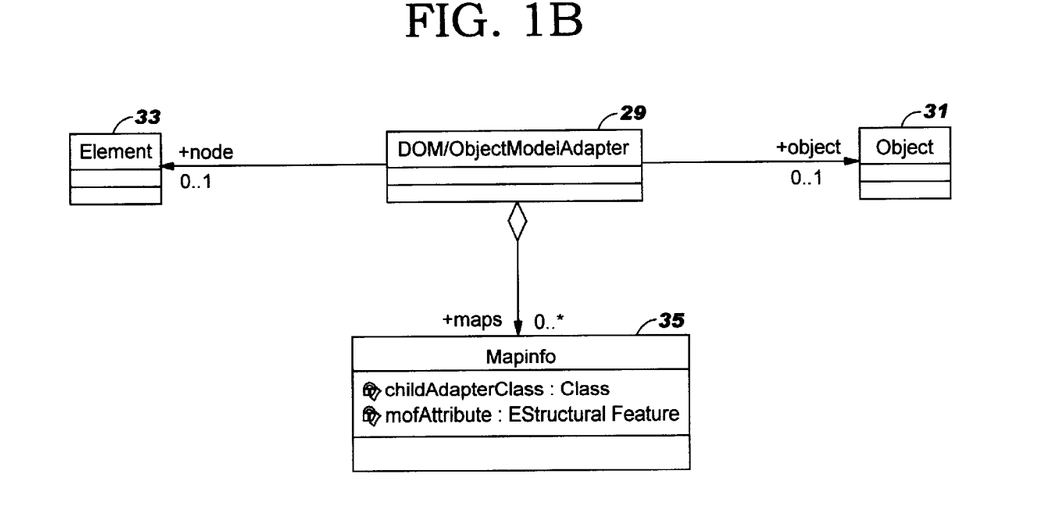
FIG. 1B is a class diagram illustrating the relationship between the object model, the DOM and the DOM/object model adapters in accordance with the present invention.

FIG. 1A is a block diagram illustrating the basic components of the present invention and their relationships to each other. FIG. 1B is a class diagram for the adapters in accordance with the present invention. In an XML editor environment, a developer using an editor software program will retrieve and open an XML document 11. The editor will parse the document and build the DOM tree 14 of the document when the file is opened. The DOM tree can be graphically rendered on a computer display monitor. The XML file also can be rendered directly as text view in another view on the display monitor. In order to render a display view of the XML file, the DOM is converted to an object model 12. The object model 12 is then rendered and displayed to the user through an appropriate graphical user interface (GUI) 17 in another view on the display monitor. Block 16 comprises the mechanisms of the present invention for generating the object model from the DOM and for synchronizing the object model and DOM to each other. The mechanism 16 comprise a plurality of DOM/object model adapters 16a, 16b, . . . , 16n. To the left of block 16 are the display-side components and to the right are the source-side components.

FIG. 1B is the class diagram illustrating the relationships of the various components corresponding to an exemplary adapter in accordance with the present invention. The DOM/object model adapter 29 sits between the DOM node 31 and the corresponding object model object 33 and utilizes the information object(s) in the map 35 to build additional adapters, as needed.

One particular application of the invention is in a XML editor for building and editing XML files in which the object model is in accordance with the Meta-Object Facility (MOF) specification promulgated by the World Wide Web Consortium (W3C), which is incorporated herein by reference. The DOM level 2 specification supports a notification protocol in which, when a DOM node is changed, the DOM can send out a notification to any software module that has registered with the DOM to receive such notification. The MOF specification also supports a notification protocol in which the MOF object reports changes made to its property to any software module that has registered with the MOF object for such notification.

In accordance with the invention, when an XML document is opened and parsed, the software builds the particular DOM/object model adapters for the particular nodes of the DOM tree. Each adapter registers with the DOM node and MOF object, respectively, to be notified when changes are made to the DOM node(s) or MOF property(ies) for which it is responsible. During the process of editing, whether editing the MOF object on the display side or editing the DOM node on the source side, when a change is made, the corresponding adapter, upon notification, reflects the change to the corresponding MOF object or DOM node, respectively. If the particular edit results in any MOF property or DOM tree node being added, the corresponding adapter is built and populated. The adapter also registers with the DOM node(s) or MOF object to be notified of changes to the DOM node or MOF property for which it is responsible.

In this manner, changes made in the source view are immediately reflected to the display view and vice versa without the need to serialize and re-parse the XML document. Accordingly, a software developer using an editor equipped with the present invention can switch between a source view and a display view during editing without the need to serialize and re-parse the XML document. It will be understood by those persons of skill in the related arts that, while, in most circumstances, there is a one to one correspondence between a DOM node and a MOF object or property that is not necessarily always true. Particularly in the MOF to DOM direction, one MOF object often corresponds to multiple DOM nodes. In such a case, an adapter would handle events for the MOF object and all the corresponding DOM tree nodes. The map will contain map info objects identifying another adapter, if the MOF property is a MOF type. In any event, the adapters are built to reflect the changes to the appropriate node or nodes and vice versa.

FIGS. 2–5 are flow diagrams illustrating various aspects of the process of the present invention. FIGS. 2 through 5 illustrate a specific embodiment of the invention in a specific example in which the XML document being edited is an Enterprise Java Bean (EJB) deployment descriptor file. As is well known to those of skill in the art, the Java Enterprise Edition specification defines a file named ejb-jar.xml which can be deployed to a server to enable the server to run Enterprise Java Beans. The ejb-jar.xml file has certain tags and attributes that it must contain plus other tags and attributes that it may contain. Thus, a software developer editing an ejb-jar.xml file may call up the standard file and then, using an XML editor, further populate it as needed for the particular application. FIGS. 2 through 5 illustrate a particular example of the process of the present invention used to populate an ejb-jar.xml file.

Figure 2:
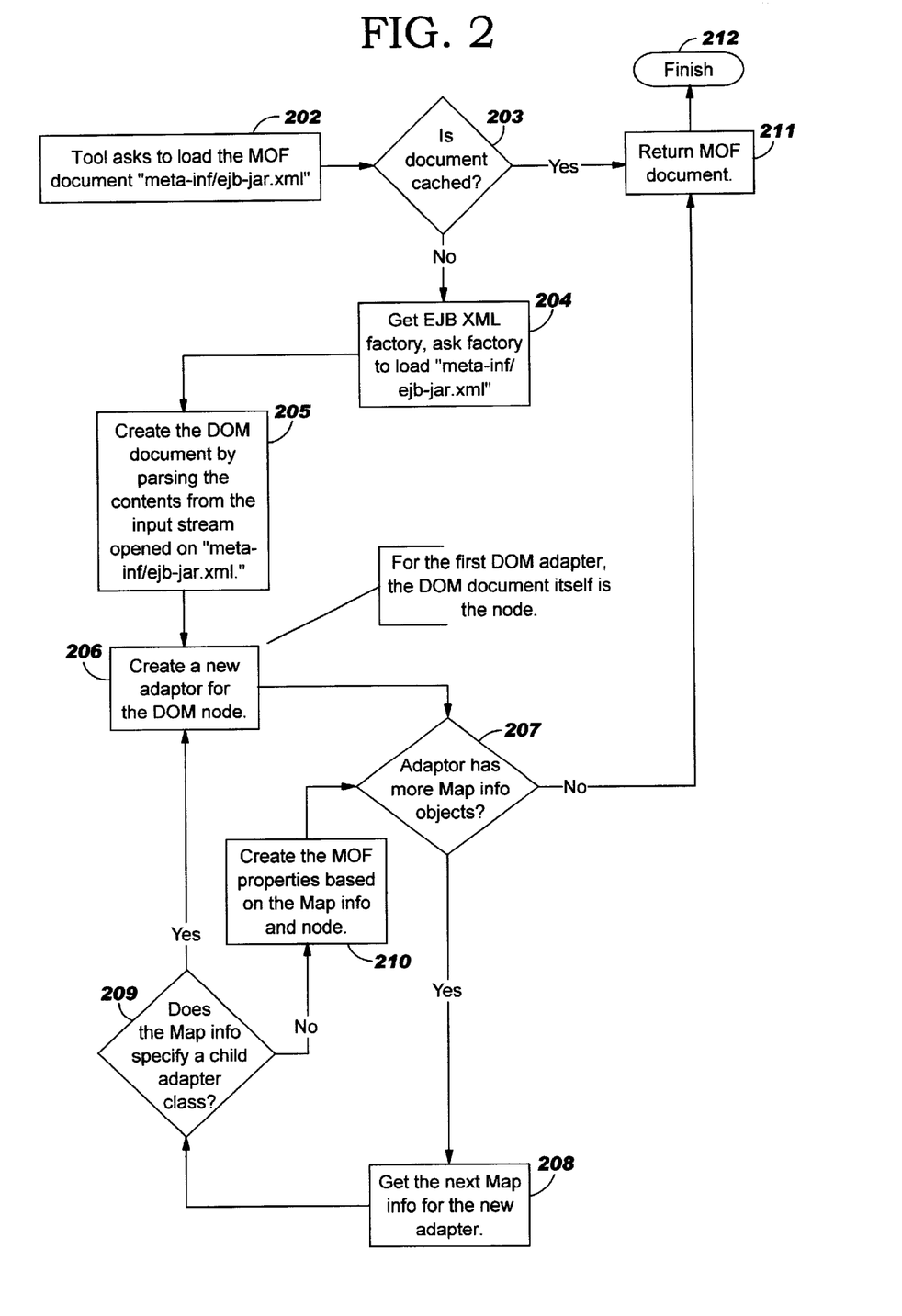
FIG. 2 is a flow diagram illustrating the process of loading an object model responsive to opening of a XML document in accordance with the present invention.

Turning to FIG. 2, it illustrates a process in accordance with one particular embodiment of the present invention of loading a MOF document in order to render a display view of an ejb-jar.xml file when a developer initially calls up the file in an XML editor tool. The process starts at step 202 when the operator (a software developer using the editor software to develop an XML document) asks the software tool to open a particular XML document, in this case the standard EJB file named META-INF/ejb-jar.xml. In step 203, the tool first checks cache memory to determine if the document has already been loaded or created and a MOF already generated and stored in cache. If so, flow proceeds to step 211 where the MOF document is retrieved from cache memory and the process ends at step 212. Assuming, however, that the MOF has not already been generated and cached, flow proceeds to step 204. In step 204, the tool retrieves the registered EJB-XML factory and asks the factory to load the file named "META-INF/ejb-jar.xml". Flow then proceeds to step 205, in which the editor parses the contents from the input stream opened on the document and creates the DOM document.

Flow then proceeds to step 206, wherein the factory creates the root adapter for the DOM document, wherein the DOM document is the first node in the DOM tree. In the first pass through step 206, the DOM document itself is the node (the top level node). More particularly, the map contains all of the information necessary to develop the DOM/object model adapter. For exemplary purposes and in order not to obfuscate the invention, let us assume an embodiment in which a separate adapter is provided for each node. The tool reads the information out of the map pertaining to the particular node to determine which DOM-to-MOF and MOF-to-DOM procedures are needed for the adapter and builds an adapter accordingly. As is well known in the art, each node in the DOM tree may have one or more attributes or other characteristics as well as child nodes. All of these individual pieces of information are contained in the map and are herein called map info objects. In building each adapter, the editor loops through steps 206, 207, 208, 209, and 210 (as described fully below) until all map info objects pertaining to that node have been taken care of.

Thus, as previously noted, in steps 206, the tool creates the adapter for the DOM node (in the first instance the top level node is the DOM document itself). Flow then proceeds to step 207. In step 207, it is determined whether there are anymore map info objects pertaining to this DOM node. If not, the adapter is completely constructed and flow proceeds to step 211 and 212 where the MOF document is returned and the procedure ends, respectively. However, if there are more map info objects, flow instead proceeds from step 207 to step 208. In step 208, the next map info object for that adapter is retrieved. Flow then proceeds to step 209. The process of step 209 classifies each map info object into one of two classes, namely, (1) a primitive property (i.e., a property whose type is not a class in the object model) or (2) a property representing another object in the object model. If it does not identify a child adapter, then flow proceeds to step 210. In step 210, the MOF properties pertaining to that map info object are created and added to the adapter. Flow then proceeds back to step 207 where it is determined whether there are any more map info objects.

If, on the other hand, in step 209, it is determined that the map info object does specify a child adapter, then flow instead proceeds from step 209 back to step 206 where an adapter is created for the new adapter. Flow then proceeds again to step 207, to determine whether there are any other map info objects pertaining to the new adapter. Flow iterates through step 206, 207, 208, 209 and 210 until there are no longer any map info objects pertaining to the XML document.

Figure 3:
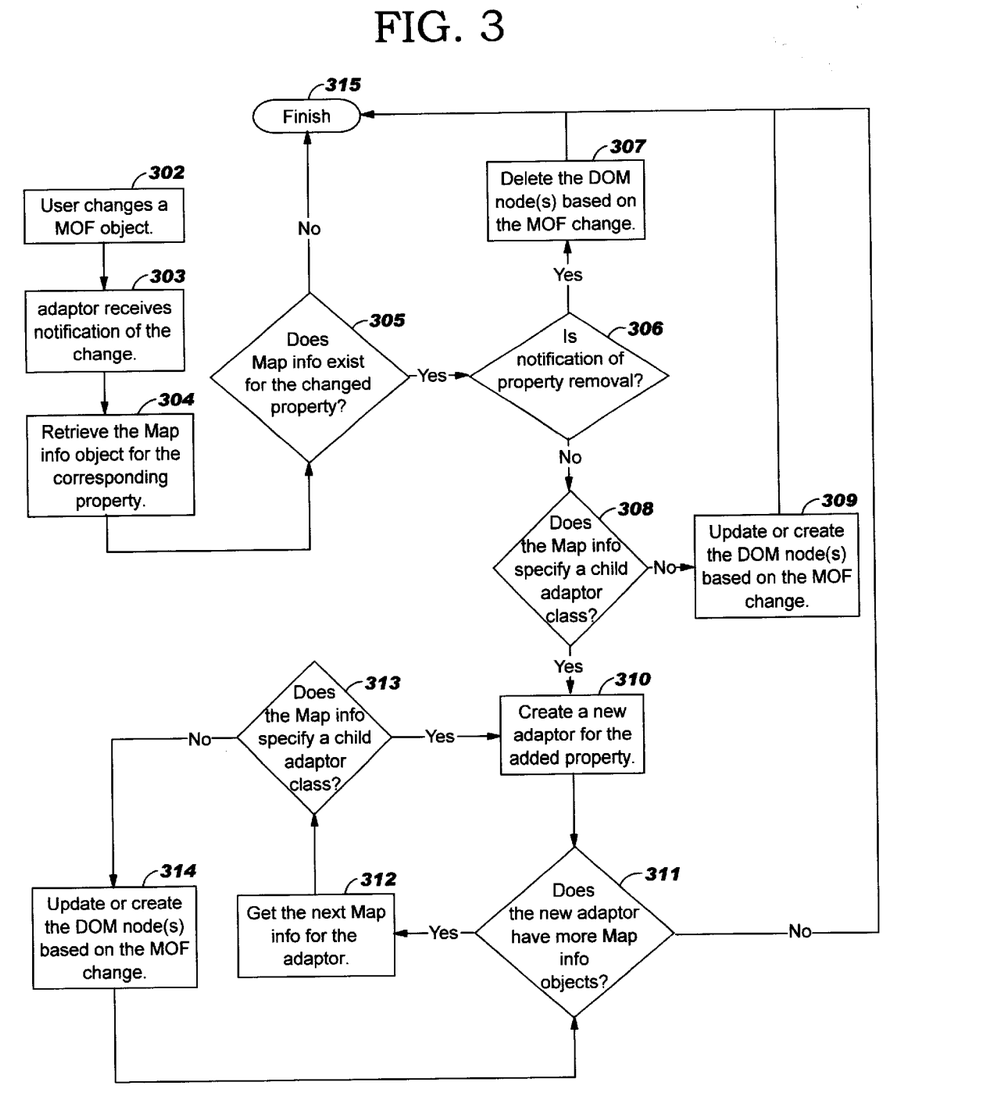
FIG. 3 is a flow diagram illustrating the process of updating a DOM responsive to a change to a property in an object model in accordance with the present invention.

FIG. 3 illustrates operation in accordance with the present invention when the user of the software updates a MOF object, i.e., makes a change in a display view which must be reflected to the source view. The process starts in step 302 when the user changes a MOF object by manipulating something in one of the display views 17, 19. In step 303, the appropriate adapter receives notification of the property change because, when the MOF to DOM adapter was built in step 206, it registered with the MOF object to be notified of changes. Flow then proceeds to step 304, where the software attempts to retrieve the map info object from the map 18 corresponding to the changed property.

Next, in step 305, the software determines whether a map info object was found. If not, nothing is done since the adapter is not interested in this property and flow proceeds to the finish step 315. However, assuming that a corresponding map info object exists, flow instead proceeds from step 305 to step 306. In step 306, the adapter determines whether the notification it received is a notification that the MOF property is being removed. If so, flow proceeds to step 307, where the DOM node(s) corresponding to the deleted MOF property are deleted. Flow then proceeds to the finish step 315.

If, however, in step 306, the received notification is not a property removal, flow instead proceeds to step 308. In step 308, the adapter determines whether the map info object specifies a child adapter for the changed property. If not, flow proceeds to step 309 in which the appropriate DOM node is updated (or created) based on the MOF change. Since there are no child adapter classes, the process is completed and flow proceeds to the finish step 315.

If, however, the map info object for the particular property that was changed specifies a child adapter, this means that the property value is another MOF object. Therefore, a new adapter for the added MOF object must be added. Accordingly, flow would proceed from step 308 to step 310 and loop through steps 310, 311, 312, 313 and 314 for each map info object in each new adapter that must be added. Steps 310, 311, 312, 313 and 314 are very similar to step 206, 207, 208, 209 and 210, respectively, of FIG. 2. Particularly, in step 310, a new adapter is created for the added property. Flow then proceeds to step 311, where it is determined whether the new adapter just created in step 310 has more map info objects of its own. If not, then the process is finished and the flow proceeds to the finish step 315. However, if there are further pertinent map info objects, then flow instead proceeds from step 311 to step 312. In step 312, the next map info object for that particular adapter is retrieved and flow proceeds to step 313. In step 313, it is determined whether or not the map info object specifies a further child adapter class. If not, then flow proceeds from step 312 to step 314, wherein the DOM node corresponding to the added MOF property is created or updated as the case may be. Flow then proceeds from step 314 back to step 311 to determine whether there are any more map info objects. If, on the other hand, in step 312, the map info object does specify a child adapter class, then flow instead proceeds to step 310 to create a new child adapter. Flow iterates through steps 310, 311, 312, 313 and 314 until there are no more map info objects corresponding to the MOF property changed in step 302.

Figure 4:
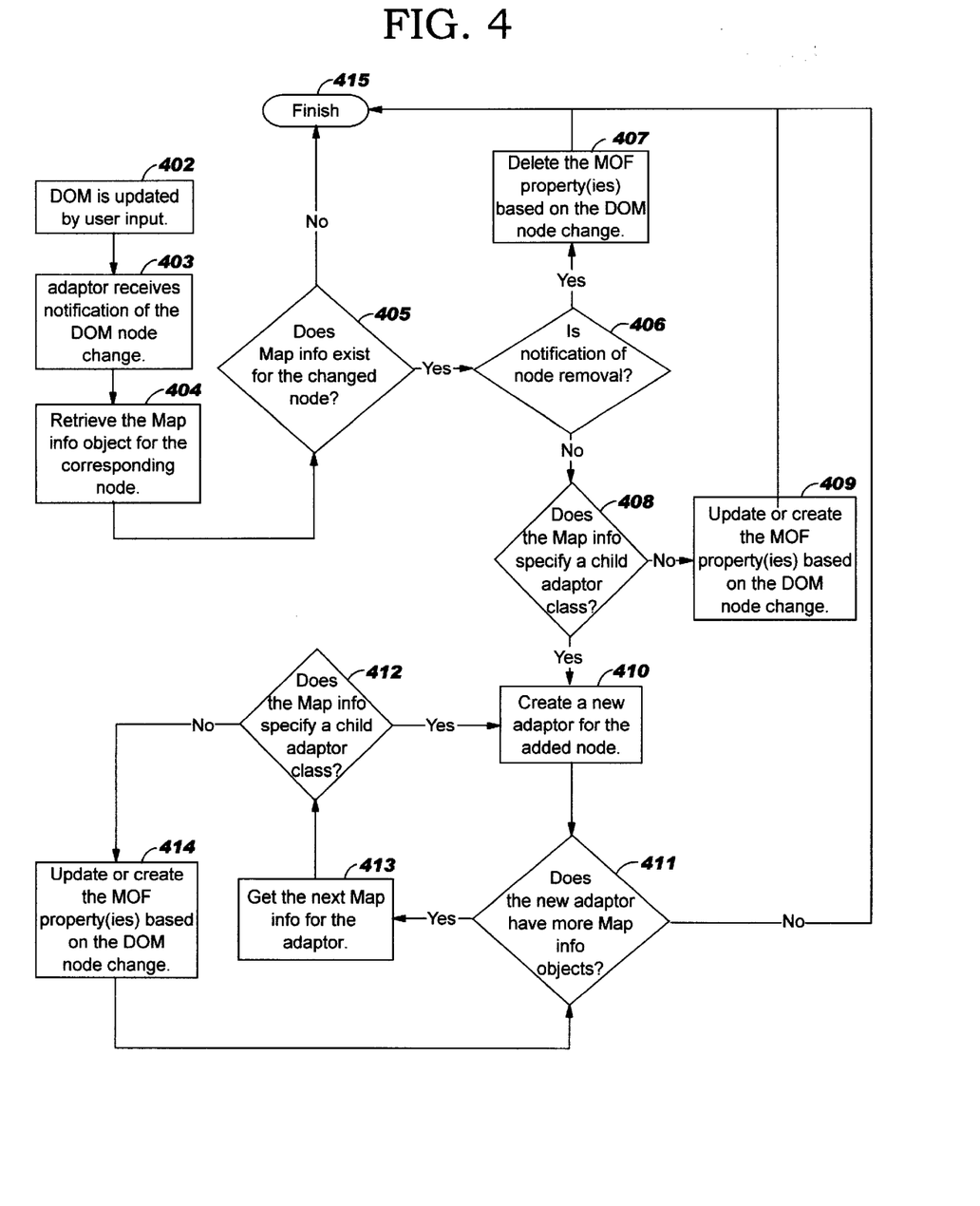
FIG. 4 is a flow diagram illustrating the process of updating an object model responsive to a change to a node of a DOM in accordance with the present invention.

FIG. 4 illustrates the process when the user updates a DOM node, i.e., enters an update in a source view, rather than a display view. As will become clear, the process performed responsive to the editing of a DOM node is very similar to the inverse process just described in connection with FIG. 3 performed responsive to updating of a MOF object except that the update is done in the opposite direction, i.e., DOM-to-MOF. In step 402, the DOM is updated by the user. Responsive to the update, in step 403, the pertinent adapter receives notification of the DOM node change since it has registered to receive such notifications. Flow then proceeds to step 404, in which the software attempts to retrieve the map info object from the adapter that received the notification of the changed DOM node. In step 405, the software determines whether any such map info exists. If not, then no changes can be reflected and flow proceeds to the finish step 415.

If, however, a map info object exists for the changed node, flow proceeds to step 406 where it is determined if the edit was the removal of the node. If so, flow proceeds to step 407, where the adapter deletes the MOF property(ies) corresponding to the removed DOM node. At this point, the process is finished and flow proceeds to step 415. If, however, in step 406, the change is not the removal of the node, flow instead proceeds from step 406 to step 408.

In step 408, the adapter determines whether the map info object specifies a child adapter class. If not, flow proceeds from step 408 to step 409. In step 409, the MOF property(ies) corresponding to the changed node are updated accordingly. At this point, the process is finished. If, on the other hand, in step 408, the map info does specify a child adapter class, then flow proceeds to step 410 to loop through steps 410, 411, 412, 413 and 414 for every relevant map info object of the new adapter. In step 410, a new child adapter is created. Flow then proceeds to step 411, where it is determined whether the new adapter has any more map info objects. (There always is at least one map info object for each adapter). If not, the process ends at step 415. If, the new adapter does have more map info objects, flow instead proceeds from step 411 to step 413. In step 413, the next map info object for that adapter is retrieved. Flow then proceeds to step 412, in which it is determined whether that map info object specifies a child adapter or is a map info object for a primitive property. If it is not a specification of a child adapter, flow proceeds from step 412 to step 414, in which the MOF property(ies) corresponding to the new DOM node are updated (or created) in accordance with the DOM node change. Flow then proceeds from step 414 back to step 411 to determine whether there are any further pertinent map info objects. If, on the other hand, in step 412, the map info object does specify a child adapter, flow instead proceeds from step 412 to step 410. In step 410, the child adapter is created. Flow then proceeds back to step 411 to determine whether there are any further pertinent map info objects. Flow will proceed through steps 410, 411, 412, 413 and 414 until there are no further pertinent map info objects for a given adapter.

Figure 5:
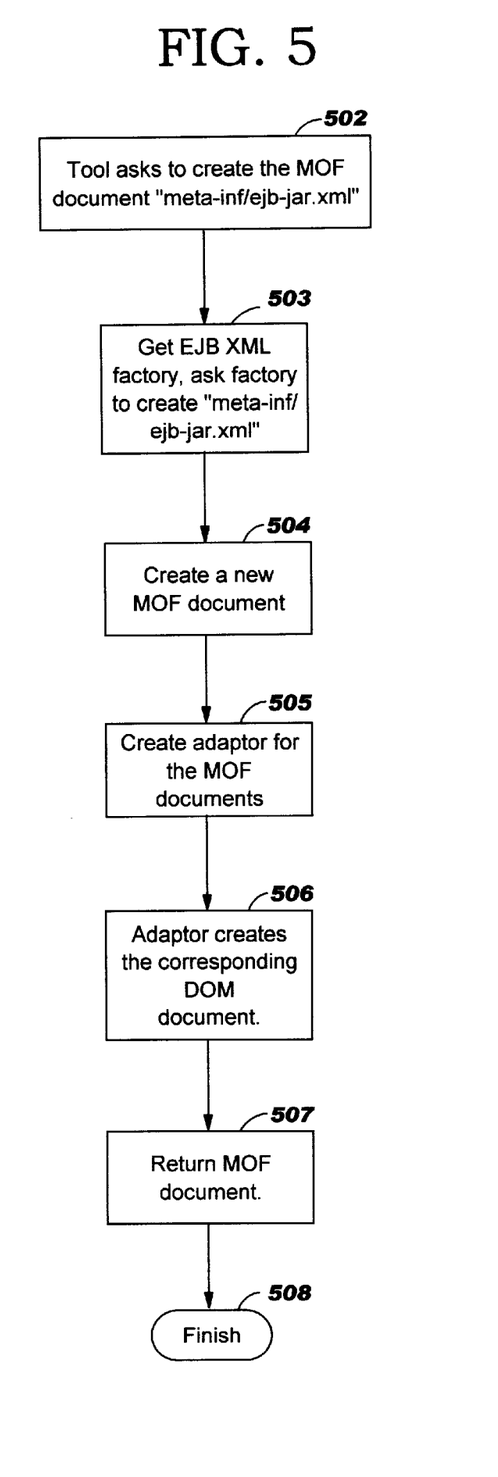
FIG. 5 is flow diagram illustrating the process of creating an object model responsive to the opening of an XML document when one does not already exist.

For sake of completeness, FIG. 5 illustrates the processing steps responsive to the creation of a MOF document. Particularly, while FIG. 2 illustrated the processing responsive to a request to load a MOF document from an existing XML file, it is also possible for a user to request the creation of a MOF document. It will be seen from the description below that steps 502, 503, 504, 505, 506, 507 and 508 in FIG. 5 correspond closely to steps 202, 204, 205, 210 and 212 in FIG. 2. Particularly, in step 502, the user asks the tool to create a MOF document. Again, we use the example of the META-INF/ejb-jar.xml document that is a standard document defined in the EJB specification. Accordingly, in step 503, the software retrieves the EJB XML factory and asks the factory to create the document "META-INF/ejb-jar.xml". Flow then proceeds to step 504, where the DOM for that document is created. Flow then proceeds to step 505, wherein the root DOM/object model adapter for that DOM document is created. Flow then proceeds to step 506, in which the adapter software module is run to create the corresponding DOM node from the MOF document. Flow then proceeds to step 507, in which the MOF document is returned. The process ends at step 508.

In accordance with the present invention, edits made by an operator to the DOM can be immediately reflected to the object model and display views without re-parsing the XML document. Likewise, changes made in the display view or object model can be reflected to the DOM tree immediately without re-parsing.

While the invention has been described in connection with an XML editor, it has application outside of an editor environment. For example, the invention can be useful in situations where a minor change to a DOM is desired but it is undesirable to bring down an operating server. For instance, many businesses, like banks and airlines, require their server to be up twenty-four hours a day, seven days a week. In such a case, it would be undesirable to bring a server down in order to update one XML document. In such a case, the present invention can be utilized to enter a change in the DOM and reflect that change to existing instances of object models built from that DOM without bringing the server down. In fact, the existing instances of the object model do not even need to be deleted and re-generated by re-parsing the XML document.

Having thus described a few particular embodiments of the invention, various alterations, modifications, and improvements will readily occur to those skilled in the art. Such alterations, modifications and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

We claim:

1. A method of synchronizing an XML Document Object Model (DOM) with its object model, said method comprising the steps of:
    (1) storing a map of information objects for nodes of said DOM, said information objects comprising information about said nodes needed to transfer changes made to said DOM nodes to corresponding object model objects and changes made to said corresponding object model objects to said DOM nodes;
    (2) for each node of said DOM, using said map information objects to create an adapter software module adapted to transfer changes in said DOM node to a corresponding object model object and changes in said corresponding object model object to said DOM node; and
    (3) responsive to creation of, or other change in, a DOM node or an object model object, running said corresponding adapter software module to transfer the change to said corresponding other of said DOM node or object model object, whereby changes made in one are reflected to the other without re-parsing an XML document.

2. The method of claim 1 wherein said map comprises a plurality of information object collections, each collection of information objects corresponding to one adapter.

3. The method of claim 2 wherein said map information objects include map information objects that identify child adapters of an adapter.

4. The method of claim 3 wherein step (2) comprises the steps of:
    (2.1) creating an adapter corresponding to a node of said DOM;
    (2.2) consulting said map for map information objects corresponding to said adapter; and
    (2.3) for each map information object that identifies a child adapter to said adapter, creating said child adapter by repeating steps (2.1) and (2.2).

5. The method of claim 4 wherein said map information objects further comprise primitive objects and further wherein step (3) comprises, for each primitive map information object corresponding to an adapter, transferring said change from said DOM node or said object model object to the other of said object model object or said DOM node.

6. The method of claim 5 wherein step (2) further comprises the step of:
   (2.4) for each adapter created, registering each said adapter with said corresponding DOM node and said corresponding object model object to receive notifications of changes therein.

7. The method of claim 6 wherein step (3) further comprises the steps of:
   (3.1) receiving notification of a change from a changed DOM node or object model object;
   (3.2) running the adapter corresponding to said changed DOM node or object model object;
   (3.3) transferring said change from said changed DOM node or said changed object model object to said corresponding object model object to said corresponding DOM node, respectively.

8. The method of claim 7 wherein step (3.3) comprises the steps of:
   (3.3.1) if the change in said DOM node or object model object is a removal of said DOM node or object model object, removing said corresponding object model object or DOM node;
   (3.3.2) if a map information object corresponding to said changed DOM node or changed object model object does not identify a child adapter and said object model or DOM already contains said corresponding object model object or DOM node, respectively, updating said corresponding object model object or DOM node; and
   (3.3.3) if a map information object corresponding to said changed DOM node or changed object model object does not identify a child adapter and said object model or DOM does not already contains said corresponding object model object or DOM node, respectively, creating said corresponding object model object or DOM node.

9. The method of claim 1 wherein said method is embodied within an XML editor software application.

10. The method of claim 1 wherein said object model is a Meta Object Facility object model.

11. The method of claim 1 wherein each adapter corresponds to one and only one DOM node.

12. The method of claim 1 wherein there is a one to one correspondence per adapter between a DOM node and said corresponding object model object.

13. A computer readable product embodied on computer readable media readable by a computing device, said product for synchronizing an XML Document Object Model (DOM) with its object model, said computer program product comprising computer executable instructions for:
   (1) storing a map of information objects for nodes of said DOM, said information objects comprising information about said nodes needed to transfer changes in said DOM nodes to corresponding object model objects and changes in said corresponding object model objects to said DOM nodes;
   (2) for each node of said DOM, using said map information objects to create an adapter software module adapted to transfer changes in said DOM node to a corresponding object model object and changes in said corresponding object model object to said DOM node; and
   (3) responsive to creation of, or a change in, a DOM node or an object model object, running said corresponding adapter software module to transfer the creation of, or change in, said corresponding other of said DOM node or object model object, whereby changes made in one are reflected to the other without re-parsing an XML document.

14. The computer readable product of claim 13 wherein said map comprises a plurality of information object collections, each information object collection corresponding to one adapter.

15. The computer readable product of claim 14 wherein said map information objects include map information objects that identify child adapters of the corresponding adapter.

16. The computer readable product of claim 15 wherein computer executable instructions (2) above comprise computer executable instructions for:
   (2.1) creating an adapter corresponding to a node of said DOM;
   (2.2) consulting said map for map information objects corresponding to said adapter; and
   (2.3) for each map information object that identifies a child adapter to said adapter, creating said child adapter by repeating steps (2.1) and (2.2) for said child adapter.

17. The computer readable product of claim 16 wherein said map information objects further comprise primitive objects and further wherein computer executable instructions (3) comprise, for each primitive map information object corresponding to an adapter, transferring said change from said DOM node or said object model object to the other of said object model object or said DOM node.

18. The computer readable product of claim 17 wherein computer executable instructions (2) further comprise:
   (2.4) for each adapter created, registering each said adapter with said corresponding DOM node and said corresponding object model object to receive notifications of changes therein.

19. The computer readable product of claim 18 wherein computer executable instructions (3) further comprise:
   (3.1) receiving notification of a change from a changed DOM node or object model object;
   (3.2) running the adapter corresponding to said changed DOM node or object model object;
   (3.3) transferring said change from said changed DOM node or said changed object model object to said corresponding object model object to said corresponding DOM node, respectively.

20. The computer readable product of claim 19 wherein computer executable instructions (3.3) comprise:
   (3.3.1) if the change in said DOM node or object model object is a removal of said DOM node or object model object, removing said corresponding object model object or DOM node;
   (3.3.2) if a map information object corresponding to said changed DOM node or changed object model object does not identify a child adapter and said object model or DOM already contains said corresponding object model object ro DOM node, respectively, updating said corresponding object model object or DOM node; and
   (3.3.3) if a map information object corresponding to said changed DOM node or changed object model object does not identify a child adapter and said object model or DOM does not already contains said corresponding object model object ro DOM node, respectively, creating said corresponding object model object or DOM node.

21. The computer readable product of claim 13 wherein said forms part of an XML editor software application.

22. The computer readable product of claim 21 wherein said object model is a Meta Object Facility object model.

23. A method of synchronizing a source side version of a computer file with its display side version, said method comprising the steps of:

(1) storing a map of information objects for portions of said source side version, said information objects comprising information about said source side portions needed to transfer changes in said source side portions to corresponding display side portions and changes in said corresponding display side portions to said source side portions;

(2) for each source side portion, using said map information objects to create an adapter software module adapted to transfer changes in said source side portions to a corresponding display side portion and changes in said corresponding display side portion to said source side portion; and (3) responsive to creation of, or a change in, a source side portion or a display side portion, running said corresponding adapter software module to transfer the change to said corresponding other of said source side portion or display side portion, whereby changes made in one are reflected to the other.

24. The method of claim 23 wherein said map comprises a plurality of information object collections, each collection of information objects corresponding to one adapter.

25. The method of claim 24 wherein said map information objects include map information objects that identify child adapters of an adapter.

26. The method of claim 25 wherein step (2) comprises the steps of:

(2.1) creating an adapter corresponding to a source side portion;

(2.2) consulting said map for map information objects corresponding to said adapter; and (2.3) for each map information object that identifies a child adapter to said adapter, creating said child adapter by repeating steps (2.1) and (2.2).

27. The method of claim 26 wherein said map information objects further comprise primitive objects and further wherein step (3) comprises, for each primitive map information object corresponding to an adapter, transferring said change from said source side portion or said display side portion to the other of said display side portion or said source side portion.

28. The method of claim 27 wherein step (2) further comprises the step of:

(2.4) for each adapter created, registering each said adapter with said corresponding source side portion and said corresponding display side portion to receive notifications of changes therein.

29. The method of claim 28 wherein step (3) further comprises the steps of:

(3.1) receiving notification of a change from a changed source side portion or display side portion;

(3.2) running the adapter corresponding to said changed source side portion or display side portion;

(3.3) transferring said change from said changed source side portion or said changed display side portion to said corresponding display side portion or said corresponding source side portion, respectively.

30. The method of claim 29 wherein step (3.3) comprises the steps of:

(3.3.1) if the change in said source side portion or display side portion is a removal of said portion, removing said corresponding portion on the other side;

(3.3.2) if a map information object corresponding to said changed source side portion or said display side portion does not identify a child adapter and said other side portion already contains said corresponding portion, respectively, updating said corresponding portion on the other side; and (3.3.3) if a map information object corresponding to said changed DOM node or changed object model object does not identify a child adapter and said object model or DOM does not already contains said corresponding object model object ro DOM node, respectively, creating said corresponding portion on the other side.

31. The method of claim 13 wherein said method is embodied within an XML editor software application.

* * * * *